Feb. 7, 1950  R. T. RENFRO, SR  2,497,014
VACUUM OPERATED MINNOW SACK
Filed Aug. 5, 1947  2 Sheets-Sheet 1
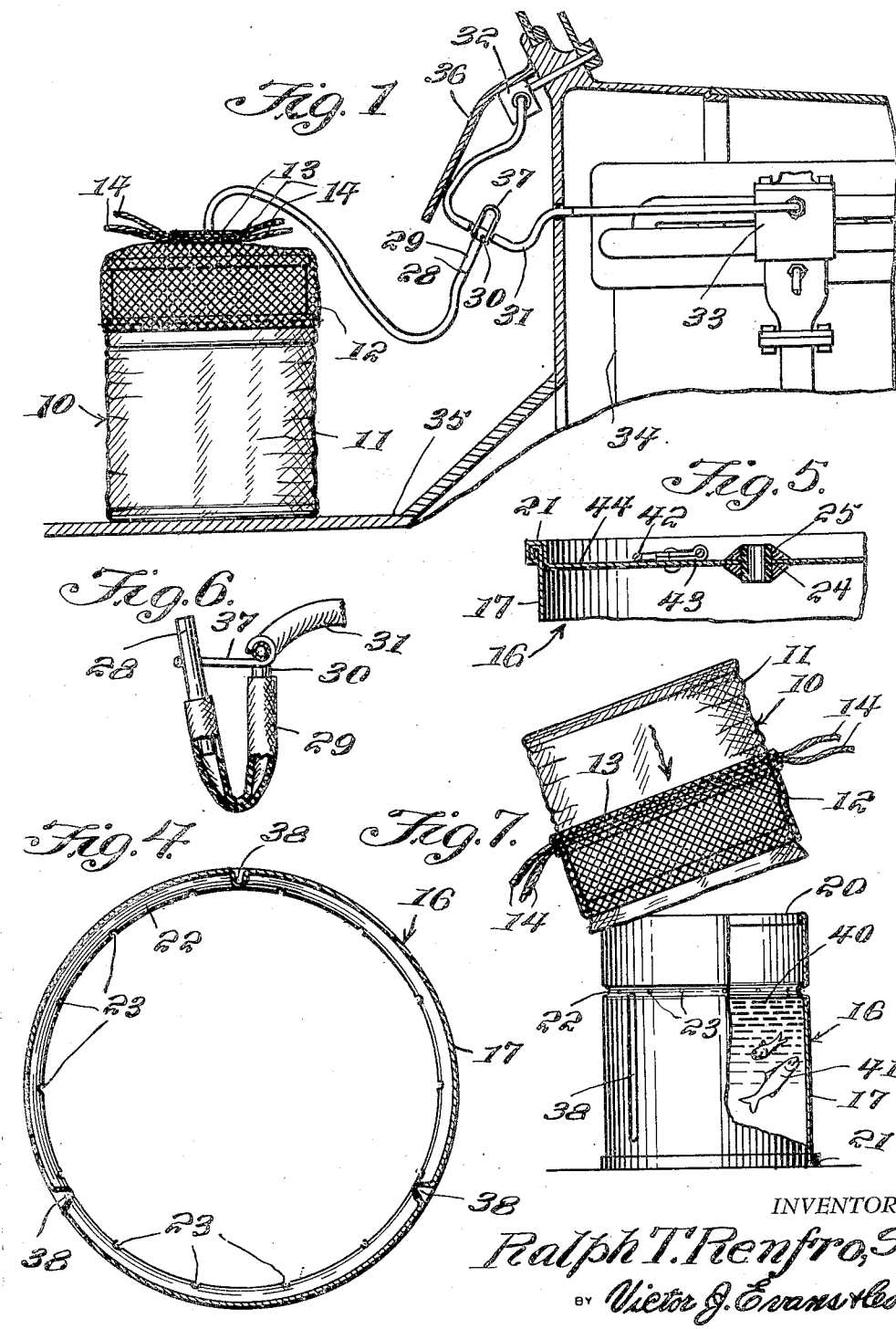
INVENTOR.
Ralph T. Renfro, Sr.
BY Victor J. Evans & Co.
ATTORNEYS

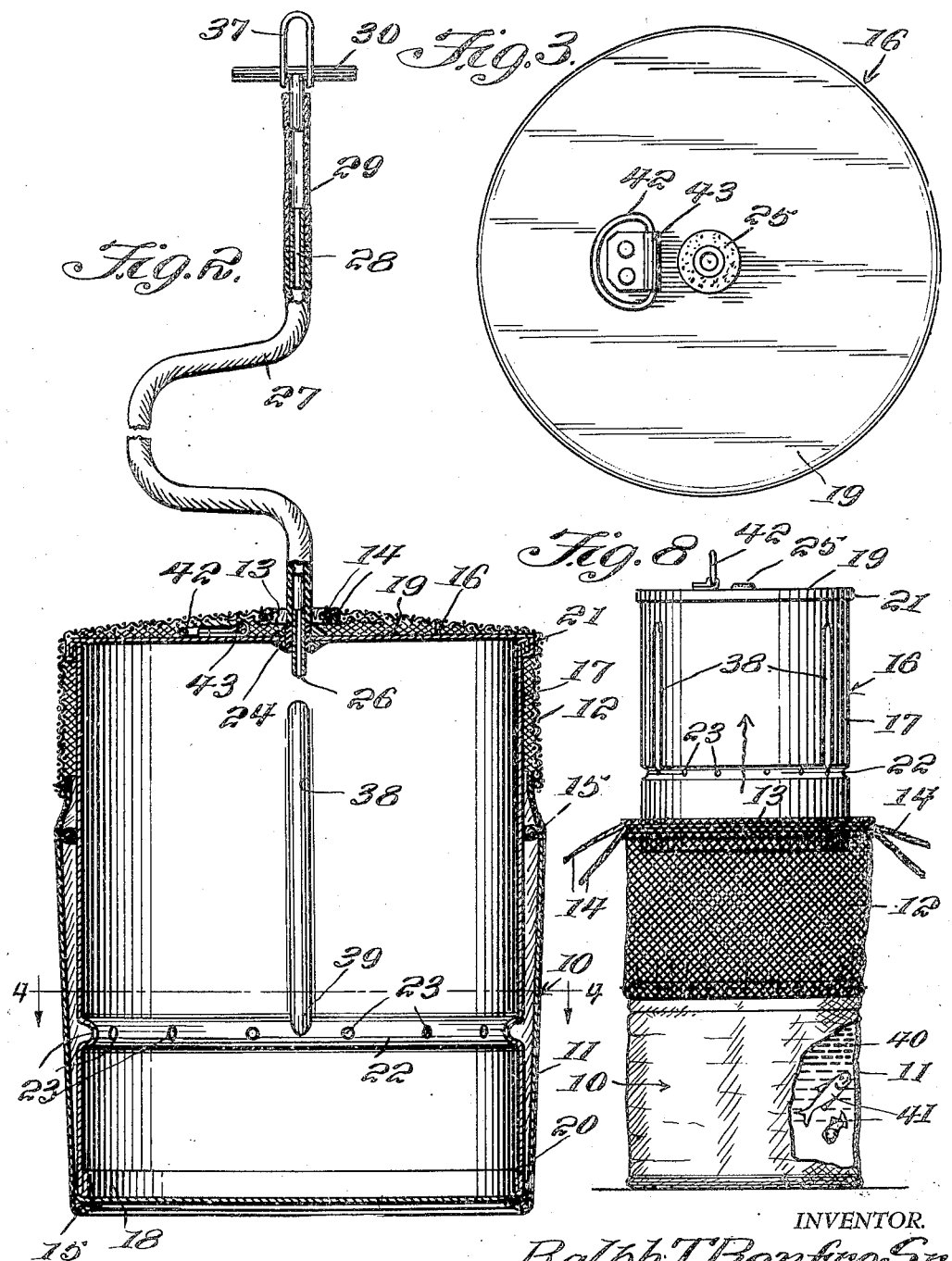

UNITED STATES PATENT OFFICE 2,497,014

VACUUM-OPERATED MINNOW SACK

Ralph T. Renfro, Sr., Boise, Idaho, assignor to Scruggs and Vaughan Manufacturing Company, Inc., Phoenix, Ariz., a corporation of Arizona Application August 5, 1947, Serial No. 766,257

1 Claim. (Cl. 43—56)

This invention relates to a vacuum-operated minnow sack, and more particularly to an aerated minnow sack that will confine a large number of minnows for transportation purposes, without harmful effect to the minnows.

An object of the invention is to provide a minnow sack having an aerating device positioned therein, which is provided with a T-shaped coupling that is interpolated in the rubber tubing leading from the manifold of an automobile to the windshield wiper motor, whereby the suction usually employed to operate the windshield wiper motor will tend to draw air into the sack for the aeration of the water therein.

The coupling is permanently fixed in the rubber tubing and the sack may be carried in the automobile adjacent the driver's feet, in the space between the front and rear seats or in the rear compartment or trunk, as desired. A rubber hose is used to connect the T-coupling to the aerating device so that the sack can be positioned in any of the above mentioned locations, and the coupling is so constructed that the aeration of the sack can be controlled as desired.

With the above and other objects and advantages in view, the invention consists of the novel details of construction, arrangement and combination of parts more fully hereinafter described, claimed and illustrated in the accompanying drawings in which:

Figure 1 is an elevational view of an embodiment of the invention showing the manner in which it is connected to the rubber tubing leading from the manifold of an automobile to the windshield wiper motor;

Figure 2 is a vertical sectional view of the device;

Figure 3 is a top plan view of the aerator;

Figure 4 is a transverse sectional view of the aerator on the line 4—4 of Figure 2 and with the cover removed;

Figure 5 is a detailed sectional view of a modified form or manner of connecting the top of the aerator to the body thereof;

Figure 6 is a detailed elevational view partly in section of the coupling used to connect the aerator to the rubber tubing from the manifold to the windshield wiper motor;

Figure 7 is an elevational view showing the manner in which the sack is applied on the aerator and Figure 8 is an elevational view showing the manner in which the aerator is removed from the sack.

Referring more in detail to the drawings, the reference numeral 10 designates a minnow sack having a bottom portion 11 which is made of heavy duck or similar material which has been water-proofed to prevent excessive leakage, yet will permit a slight seepage of the water through the heavy duck for the cooling of the water contained in the minnow sack. A top portion 12, which is made of a heavy mesh fabric, is secured to the upper rim of the bottom portion 11, and at its upper open end 13, is provided with a drawstring 14. For purposes of rigidity, the bottom portion 11 is provided with wire loops 15 which are secured within the duck, as shown in Figure 2.

Adapted for use with the sack 10 for the aeration of the water therein, during the transportation thereof, is an aerator 16. The aerator comprises a tubular body 17 having an open end 18 and the opposite end closed by the circular plate 19. The lower end of the body is rolled upon itself at 20 to provide a smooth rim, and the plate 19 is secured by crimping 21 to the opposite end of the body.

An annular indentation 22 in the body 17 adjacent the open end of the body 17 is provided with relatively spaced apertures 23, and this apertured indentation provides a means whereby air is drawn into the aerator, as will be later described. The plate 19 has located centrally thereof, an opening 24 in which is mounted a rubber gasket 25 which is adapted to removably receive the short piece of pipe 26. Connected to the pipe 26 is a rubber tube 27 of suitable length which is connected to the short piece of pipe 28 which is connected to the tubing 29 connected to the T-coupling 30.

To install the coupling 30 for operation of the aerator 16, the rubber tubing 31 from the windshield wiper motor 32 to the intake manifold 33 of the motor 34 of an automobile 35 is severed at a position below the dashboard 36. The coupling 30 is then inserted into and intermediate of the severed ends of the tubing 31. Thus the suction usually employed to operate the windshield wiper motor 32 will tend to draw air through the apertures 23 in the indentation 22.

In Figure 6, there is shown the manner in which the tubing 29 is crimped to close the tubing and prevent air from being drawn into the pipe 28. A U-shaped wire hanger 37 carried by the T-coupling 30 holding the tubing 29 in crimped position as shown in this figure.

Since there is danger of the bottom portion being drawn so tightly into contact with the wall of the body of the aerator that the air cannot enter the apertures 23, the body 17 of the aerator is provided circumferentially thereof with vertically disposed equally spaced indentations 38. These indentations permit air to enter the indentations 22 even though the bottom portion 11 is drawn tightly about the aerator, since the indentations 38 communicate with the indentations 22 at their lower ends, as shown at 39 in Figure 2.

In use, the aerator is positioned as shown in Figure 7, with the open end uppermost. Water 40 and live minnows 41 are then placed in the aerator. The sack 10, the open end 13 of which is large enough to be rolled backward over the bottom portion 11, as shown, is then placed over the aerator until the bottom of the portion 11 is in contact with the rim of the open end of the aerator. The sack and aerator are then inverted, the fabric 12 is then drawn over the aerator, and the opening 13 of the fabric 12 is closed by the drawstring 14.

The sack 10 is then placed in the automobile as shown in Figure 1. The pipe 26 connected to the tubing 27 is inserted into the gasket 25, and the tubing 27 is inserted over the pipe 28. It is understood that the T-coupling 30 has been inserted in the tubing 31, as previously stated. When the motor 34 is started, the suction created by the manifold 33 will then draw water through the aerator, as described, freshening the water and increasing the length of the life of the minnows contained therein.

When the fishing location has been reached, the tubing 27 is disconnected from the pipe 28, and the pipe 26 is withdrawn from the gasket 25. The end 13 of the sack 10 is then opened by releasing the drawstring 14, and the aerator is removed from the sack 10 as shown in Figure 8, by means of the ring 42 secured by the hanger 43 to the plate 19 adjacent the gasket 25.

The water 40 and minnows 41 remain in the sack 10, which is then immersed in the water about to be fished. The sack is tied to a boat or a fixed object in the water to prevent loss thereof, and further preservation of the minnows.

As described, the plate 19 has a plane surface, but the plate 19 can be of dished formation, as shown at 44, Figure 5, so that the gasket 25 and handle 42 will be below the crimped rim 21 of the aerator 16.

There has thus been provided, a device which will safely transport live minnows for a considerable length of time.

The indentation 22 serves a dual purpose, during the transportation of the minnows, since it divides the aerator into upper and lower compartments. The water in the upper compartment above the indentation being agitated by the air drawn therethrough, will maul the minnows if they become tired fighting the agitation of the water. The lower compartment, therefore, provides a safe haven or a body of water that is not agitated, in which the minnows may rest; thus the two distinct states of water within the aerator also aid in extending and preserving the life of the minnows.

The device is simple, inexpensive to manufacture and serves not only to preserve the minnows during the transportation thereof, but also functions as a live bait sack when fishing.

It is believed that from the foregoing description, the operation, construction and advantages of the invention will be apparent to those skilled in the art, and it is to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

A device of the character described, comprising a minnow sack for water and live minnows, a tubular aerator having a closed end and an open end in said sack, and the wall thereof provided with an annular apertured indentation and vertically equally spaced indentations communicating at their lower ends with said annular indentation whereby air is drawn into said aerator, and means connected to said aerator for drawing air through the water whereby the water will be aerated.

R. T. RENFRO, Sr.

REFERENCES CITED

The following references are of record in the file of this patent:

UNITED STATES PATENTS

| Number | Name | Date |
|---|---|---|
| 1,197,242 | Thompson | Sept. 5, 1916 |
| 2,233,564 | West | Mar. 4, 1941 |
| 2,323,318 | Farkas | July 6, 1943 |
| 2,341,246 | Stowe | Feb. 8, 1944 |